(12) United States Patent
Tang et al.

(10) Patent No.: US 11,108,315 B2
(45) Date of Patent: Aug. 31, 2021

(54) VIBRATION MOTOR

(71) Applicant: AAC Technologies Pte. Ltd., Singapore (SG)

(72) Inventors: Yun Tang, Shenzhen (CN); Lubin Mao, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 254 days.

(21) Appl. No.: 16/527,000

(22) Filed: Jul. 30, 2019

(65) Prior Publication Data

US 2020/0044533 A1 Feb. 6, 2020

(30) Foreign Application Priority Data

Aug. 3, 2018 (CN) .......................... 201821255438.4

(51) Int. Cl.
*H02K 33/00* (2006.01)
*H02K 33/12* (2006.01)
*B06B 1/04* (2006.01)

(52) U.S. Cl.
CPC .............. *H02K 33/12* (2013.01); *B06B 1/045* (2013.01)

(58) Field of Classification Search
CPC ......... H02K 33/00; H02K 33/12; H02K 33/16
See application file for complete search history.

(56) References Cited

U.S. PATENT DOCUMENTS

| 7,288,863 B2 * | 10/2007 | Kraus | B26B 19/282 |
| | | | 310/37 |
| 8,269,379 B2 * | 9/2012 | Dong | H02K 33/16 |
| | | | 310/25 |
| 2017/0110920 A1 * | 4/2017 | Mao | H02K 33/16 |
| 2017/0144191 A1 * | 5/2017 | Mao | B06B 1/045 |

* cited by examiner

*Primary Examiner* — Dang D Le
(74) *Attorney, Agent, or Firm* — W&G Law Group LLP

(57) ABSTRACT

A vibration motor in the present disclosure includes a housing, vibrators accommodated in the housing, a driving apparatus configured to drive the vibrators to vibrate, and elastic support components elastically supporting the vibrators. The driving apparatus includes coils disposed on the top wall and/or the bottom wall and an iron core that is disposed corresponding to the coils and that is fixedly connected to the housing. The vibrators include a first vibrator and a second vibrator. The first vibrator includes a first mass block and a first magnetic steel connected to the first mass block. The second vibrator includes a second mass block and a second magnetic steel connected to the second mass block. The elastic support components include a first elastic support component and a second elastic support component disposed at two sides of the vibrator.

10 Claims, 5 Drawing Sheets

VIBRATION MOTOR

TECHNICAL FIELD

The present disclosure relates to the field of vibration motors, and in particular, to a linear vibration motor that vibrates along a horizontal direction.

BACKGROUND

With the development of electronic technologies, portable consumer electronic products become more popular with people. The portable consumer electronic products, such as mobile phones, handheld game consoles, navigation apparatuses, and handheld multimedia entertainment devices generally use a vibration motor to provide system feedback, for example, in an incoming call prompt of a mobile phone, an information prompt, a navigation prompt, and vibration feedback of a game console. Such a wide range of application requires high performance of the vibration motor and a long service life.

A vibration motor generally includes a housing having an accommodating space, a vibrator accommodated in the accommodating space, and an elastic part connecting the housing and the vibrator. The elastic part supports the vibrator to move reciprocally in the housing to vibrate. The existing vibration motor generally includes only one vibrator, and consequently, a limited range of vibration frequency can be implemented, and a vibration effect that can be achieved is not enough to meet a requirement.

Therefore, it is necessary to provide a new vibration motor to solve the foregoing problems.

DETAILED DESCRIPTION

Figure 1:
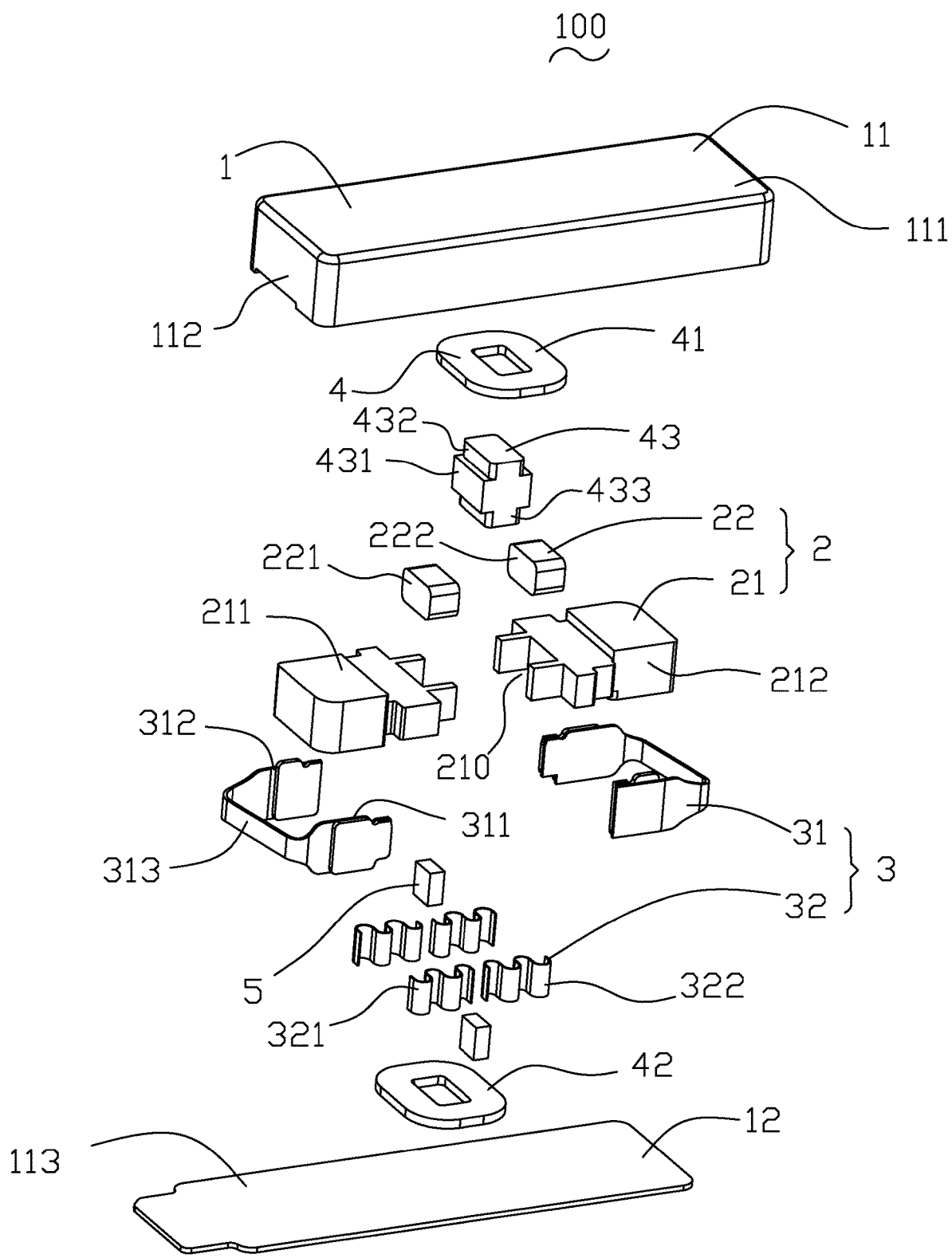
FIG. 1 is an exploded schematic structural diagram of a vibration motor according to the present disclosure.
Figure 2:
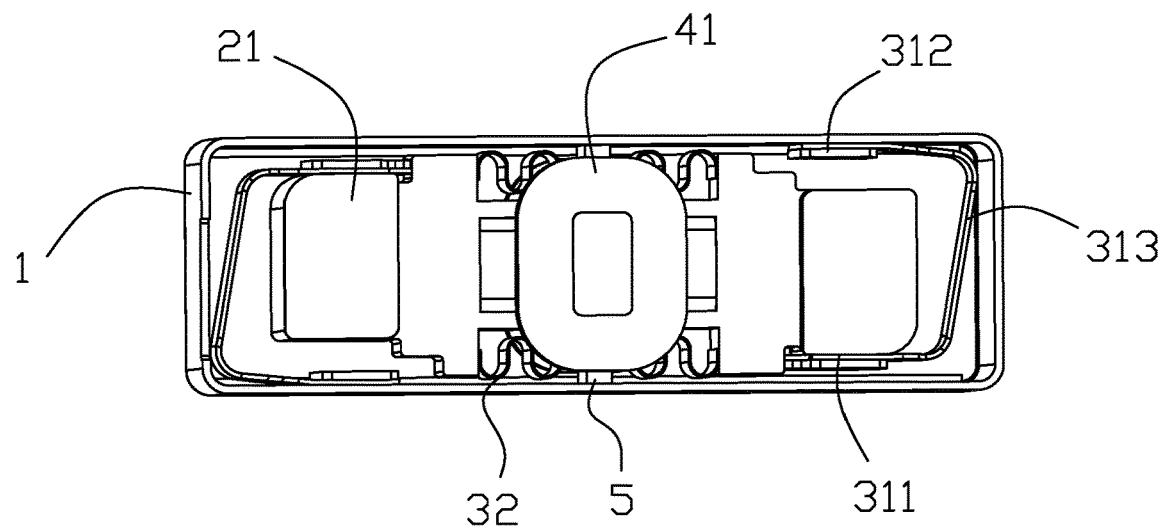
FIG. 2 is a partially assembled schematic structural diagram of a vibration motor according to the present disclosure.
Figure 3:
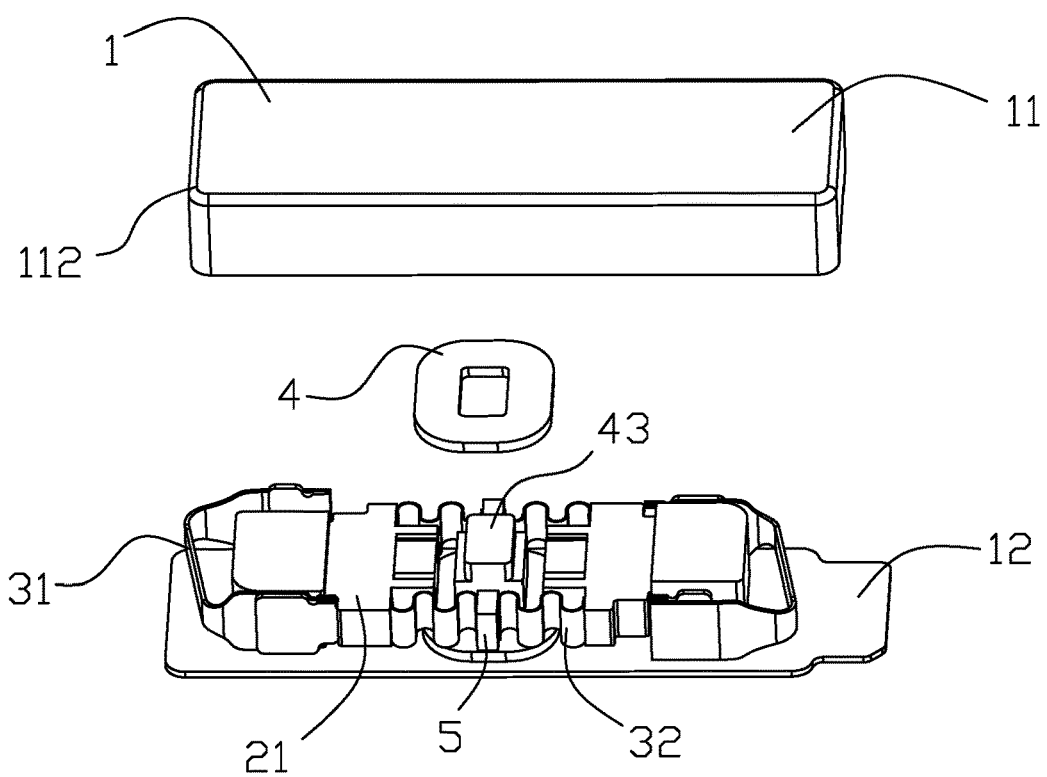
FIG. 3 is a partially exploded schematic structural diagram of a vibration motor according to the present disclosure.
Figure 4:
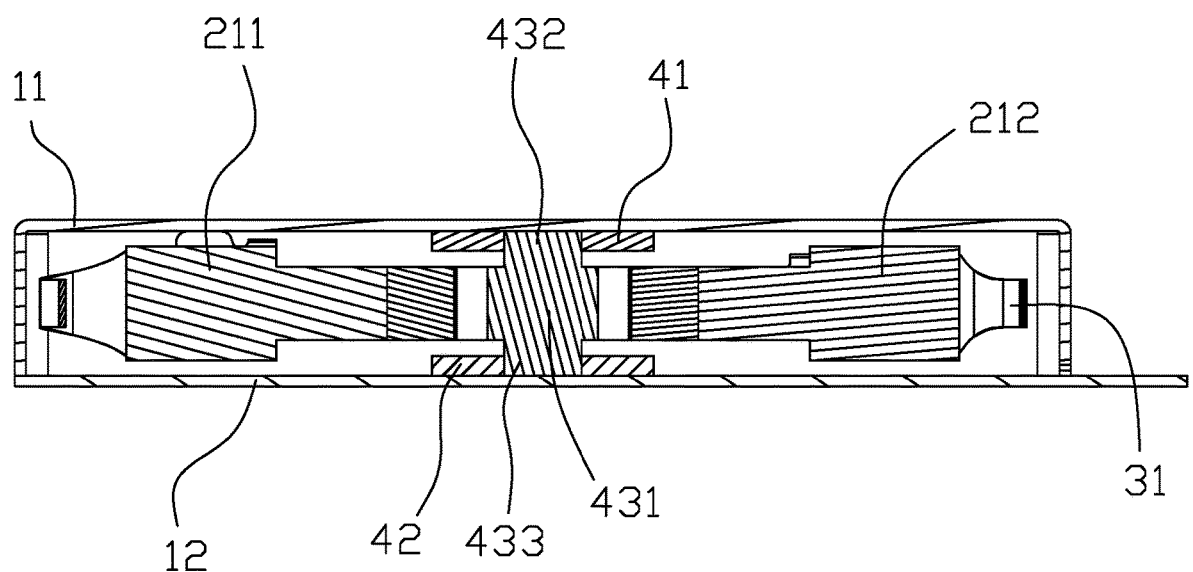
FIG. 4 is a sectional view of a vibration motor according to the present disclosure.

The present disclosure is further described below with reference to the accompanying drawings.

Embodiment 1

As shown in FIG. 1 to FIG. 4, the present disclosure provides a vibration motor 100, including a housing 1, a vibrator 2 accommodated in the housing 1, an elastic support component 3 elastically supporting the vibrator 2, and a driving apparatus 4 driving the vibrator 2 to vibrate.

The housing 1 includes a top wall 111, a bottom wall 113 corresponding to the top wall, and a side wall 112 connecting the top wall 111 and the bottom wall 113. Specifically, in this implementation, the housing 1 includes a cover 11 having the top wall 111 and the side wall 112, and a baseplate 12 that is covered by the cover 11 forms an accommodating space with the cover 11, and serves as the bottom wall 113. The driving apparatus 4 is fixed to the housing 1. The elastic support components 3 include a first elastic support component 31 and a second elastic support component 32. The first elastic support component 31 is disposed at two sides of the vibrator and is used to connect the vibrator 2 and the side wall 112. The second elastic support component 32 is used to connect the driving apparatus 4 and the vibrator 2.

The driving apparatus 4 specifically includes coils disposed on the housing 1 and an iron core 43 corresponding to the coils. The vibrator 2 includes a magnetic steel 22 corresponding to the coils and the iron core 43. When powered on, the coils are driven by a Lorentz force in a magnetic field to drive the vibrator 2 to vibrate along a direction parallel to the bottom wall 113.

Specifically, in this implementation, there are two coils, including a first coil 41 disposed on the top wall 111 and a second coil 42 disposed on the bottom wall 113. The first coil 41 and the second coil 42 are flat coils attached to the housing 1, and the first coil 41 and the second coils 42 are parallel and opposite to each other. Certainly, in another alternative implementation, one coil may alternatively be disposed, which is also implementable. The iron core 43 includes a main body portion 431, a first fixed end 432 extending from the main body portion 431 toward the top wall 111, and a second fixed end 433 extending from the main body portion 431 toward the bottom wall 113. The first coil 41 is sleeved on the first fixed end 432, and the second coil 42 is sleeved on the second fixed end 433. In a power-up process, a magnetic field is generated between the coils and the iron core 43, mutual attraction and repulsion between the coils and the magnetic steel 22 of the vibrator 2 drive the vibrator to vibrate. Naturally, only an optimal implementation of the present disclosure is provided above, and in another alternative implementation, the driving apparatus having another structure may also be used. For example, only one coil is disposed, or only one electromagnet is disposed, and it is implementable provided that a driving apparatus that is fixed on the housing and that drives the vibrator to vibrate can be disposed.

The vibrator 2 includes a mass block 21 and a magnetic steel 22 disposed on the mass block 21. Specifically, in this implementation, the vibrator 2 includes a first vibrator located on one side of an housing and a second vibrator located on the other side of the housing, and the mass block 21 includes a first mass block 211 located on one side of the iron core 43 and a second mass block 212 on the other side of the iron core 43. The magnetic steel 22 includes a first magnetic steel 221 disposed on the first mass block 211 and a second magnetic steel 222 disposed on a second mass block 212. The first magnetic steel 221 is disposed on the first mass block 211 to form the first vibrator. The second magnetic steel 222 is disposed on the second mass block 212 to form the second vibrator. The iron core 43 is disposed between the first vibrator and the second vibrator and disposed separately from the first vibrator and the second vibrator. The first vibrator is disposed between a first elastic support component 31 and a second elastic support component 32 on one side of the housing, and the second vibrator is disposed between the first elastic support component 31 and the second elastic support component 32 on the other side of the housing. Specifically, in this implementation, the first mass block 211 and the second mass block 212 have the same structure and are symmetrically disposed. The first mass block 211 and the second mass block 212 are provided with a fixing groove 210 for fixing the magnetic steel 22. The first magnetic steel 221 and the second magnetic steel 222 are disposed on two sides of the iron core 43 separately, and distances between the first magnetic steel 221 and the second magnetic steel 222 and the iron core 43 are greater than a maximum amplitude of the vibrator, so that in a vibration process of the vibrator 2, the iron core 43 moves relatively between the first magnetic steel 221 and the second magnetic steel 222.

The first elastic support component 31 includes a first elastic part connecting the first vibrator and the housing and a second elastic part connecting the second vibrator and the housing. Specifically, in this implementation, the first elastic part and the second elastic part have the same structure, and are C-type springs with opening direction provided opposite to each other. Each of the first elastic part and the second elastic part includes the first fixed portion 311 connected to the mass block 21 of the vibrator 2, the second fixed portion 312 connected to the side wall 112, and the connecting portion 313 connecting the first fixed portion 312 and the second fixed portion 313.

The second elastic support component 32 includes a first connecting spring 321 connecting the first vibrator and the iron core 43 and a second connecting Spring 322 connecting the second vibrator and the iron core 43. Specifically, there are two first connecting springs 321 and two second connecting springs 322, respectively disposed at the four corners of the iron core. The first connecting springs 321 are a pair, and each side of the first vibrator is provided with a first connecting spring 321. The second connecting springs 322 are a pair, and each side of the second vibrator is provided with a second connecting spring 322. Specifically, in this implementation, the first connecting spring 321 and the second connecting spring 322 are wavy springs.

Specifically, in this implementation, support blocks 5 disposed at two sides of the main body portion 431 of the iron core 43 are also provided. The support block 5 is connected to the housing 1. One end of the second elastic support component 32 is fixed to the support block 5, and the other end is fixed with the vibrator 2.

By setting the first elastic support component 31 and the second elastic support component 32, the vibrator 2 is supported, so that the first mass block 211 and the second mass block 212 can vibrate relatively independently, thereby achieving a dual-resonator effect.

Embodiment 2

Figure 5:
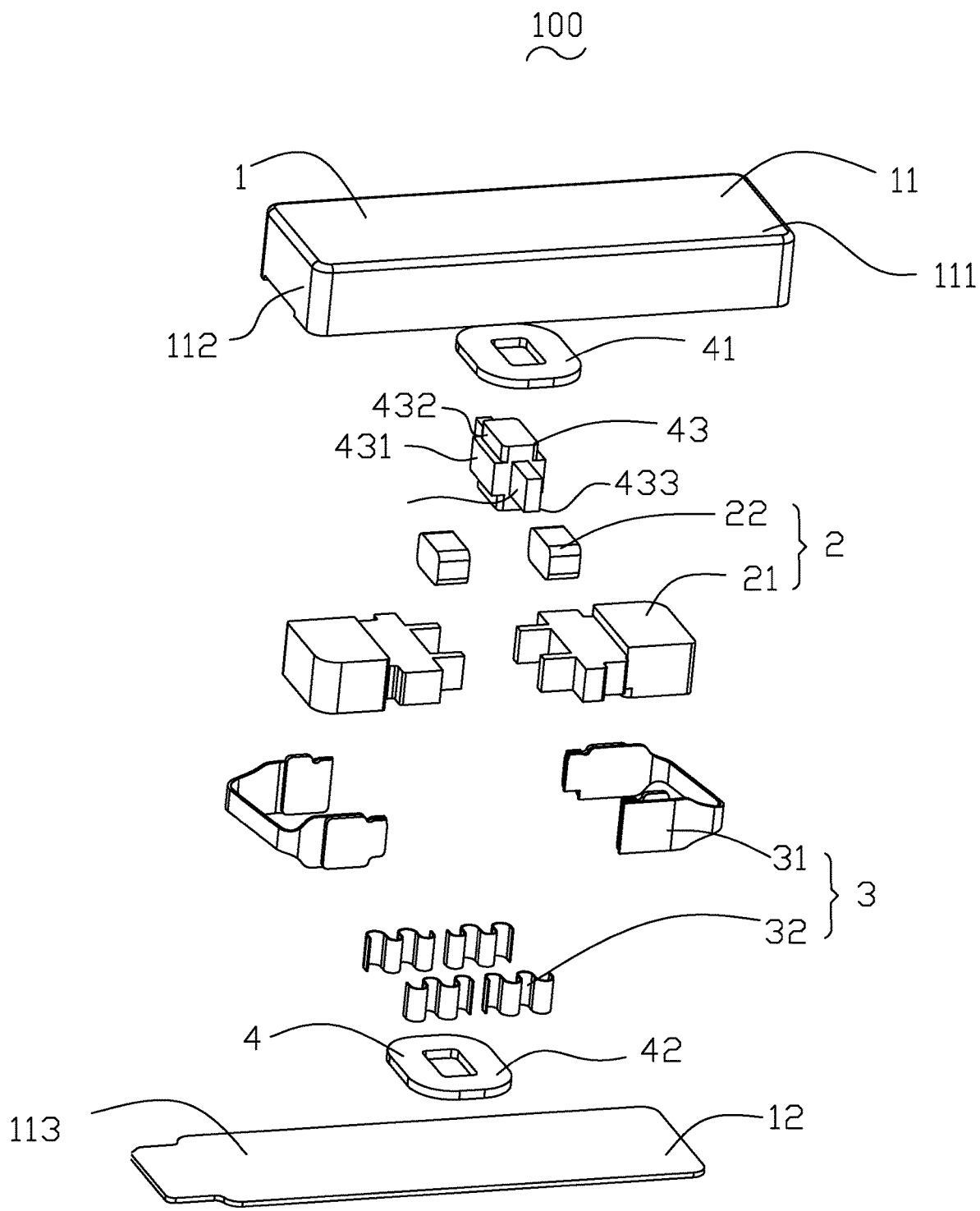
FIG. 5 is an exploded schematic structural diagram of another implementation of a vibration motor according to the present disclosure.
Figure 6:
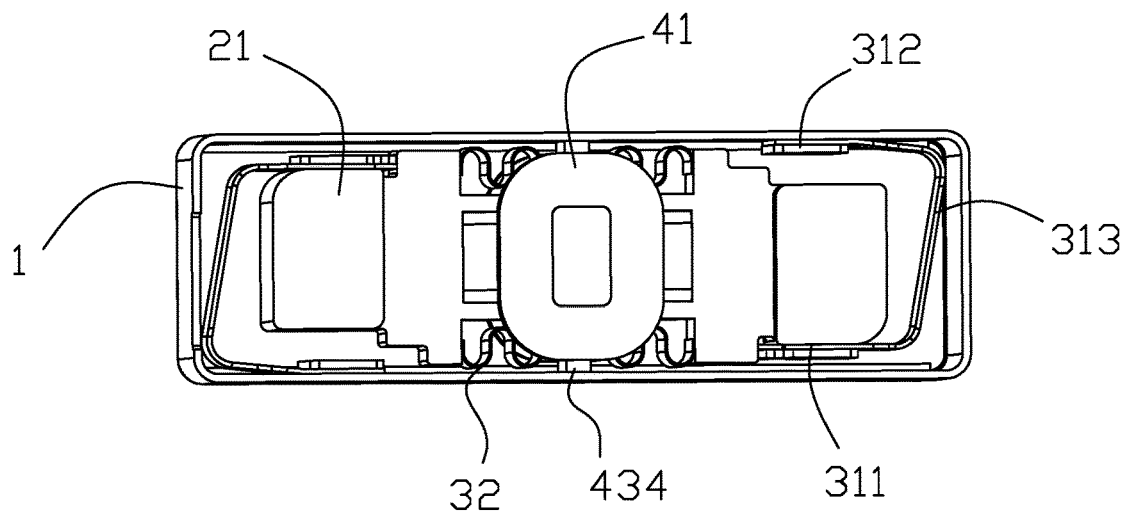
FIG. 6 is a partially assembled schematic structural diagram of another implementation of a vibration motor according to the present disclosure.
Figure 7:
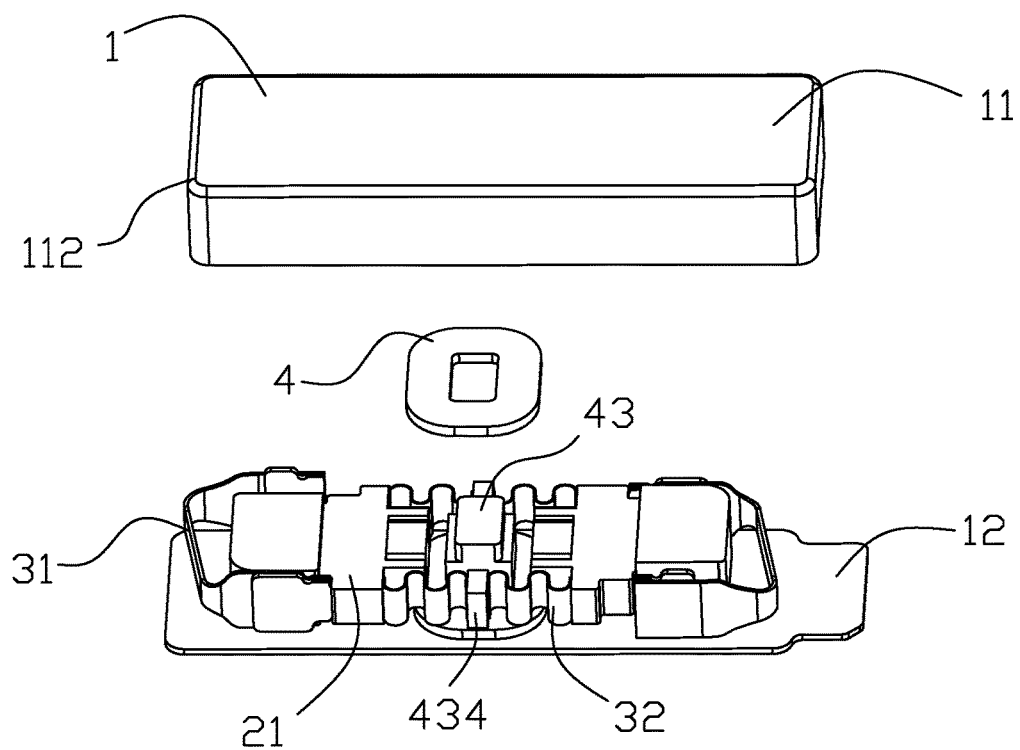
FIG. 7 is a partially exploded schematic structural diagram of another implementation of a vibration motor according to the present disclosure.

FIG. 5 to FIG. 7 are a second implementation of the present disclosure. The second implementation is roughly the same as the first implementation, and the difference only lies in that, in this implementation, the iron core 43 further includes a boss 434 extending from the main body portion 431 of the iron core 43 toward the side wall 112, a connecting spring is fixed on the boss 434, and the second elastic support component is fixed by using the boss 434. Compared with the first implementation, this implementation can reduce the number of parts, and can improve the product reliability performance.

A vibration motor in the present disclosure includes a housing, vibrators accommodated in the housing, a driving apparatus configured to drive the vibrators to vibrate, and elastic support components elastically supporting the vibrators. The housing includes a top wall, a bottom wall disposed opposite to the top wall, and a side wall connecting the top wall and the bottom wall. The driving apparatus includes coils disposed on the top wall and/or the bottom wall and an iron core that is disposed corresponding to the coils and that is fixedly connected to the housing. The vibrators include a first vibrator located at one side of the housing and a second vibrator located at the other side of the housing. The first vibrator includes a first mass block located at one side of the iron core and a first magnetic steel connected to the first mass block. The second vibrator includes a second mass block located at the other side of the iron core and a second magnetic steel connected to the second mass block. The iron core is disposed between the first vibrator and the second vibrator and disposed separately from the first vibrator and the second vibrator. The elastic support components include a first elastic support component that is disposed at two sides of the vibrator and that connects the vibrator and the side wall and a second elastic support component disposed between the first vibrator and the second vibrator. The first vibrator is disposed between the first elastic support component at one side of the housing and the second elastic support component. The second vibrator is disposed between the first elastic support component at the other side of the housing and the second elastic support component. Different mass blocks and elastic support components are disposed, so that two resonators can be formed to implement dual-resonator vibration.

Although the embodiments of the present disclosure are shown and described above, it can be understood that the embodiments are exemplary and cannot be construed as limitations to the present disclosure, and a person of ordinary skill in the art can make changes, modifications, replacement, and variations to the embodiments within the scope of the present disclosure.

What is claimed is:

1. A vibration motor, comprising a housing, vibrators accommodated in the housing, a driving apparatus driving the vibrators to vibrate, and elastic support components elastically supporting the vibrators, wherein the housing comprises a top wall, a bottom wall disposed opposite to the top wall, and a side wall connecting the top wall and the bottom wall;

the driving apparatus comprises coils disposed on the top wall and/or the bottom wall and an iron core that is disposed corresponding to the coils and that is fixedly connected to the housing;

the vibrators comprise a first vibrator located at one side of the housing and a second vibrator located at the other side of the housing, the first vibrator comprises a first mass block located at one side of the iron core and a first magnetic steel connected to the first mass block, and the second vibrator comprises a second mass block located at the other side of the iron core and a second magnetic steel connected to the second mass block, the iron core is disposed between the first vibrator and the second vibrator and disposed separately from the first vibrator and the second vibrator;

the elastic support components comprise
a first elastic support component that is disposed at two sides of the vibrator and that connects the vibrator and the side wall and
a second elastic support component disposed between the first vibrator and the second vibrator, the first vibrator is disposed between the first elastic support component at one side of the housing and the second elastic support component, and the second vibrator is disposed between the first elastic support component at the other side of the housing and the second elastic support component.

2. The vibration motor according to claim 1, wherein the first elastic support component comprises a first elastic part connecting the first vibrator and the housing, and a second elastic part connecting the second vibrator and the housing.

3. The vibration motor according to claim 2, wherein the first elastic support component is a C-type spring, and the first elastic part and the second elastic part each comprise a first fixed portion connected to the vibrator, a second fixed portion connected to the side wall, and a connecting portion connecting the first fixed portion and the second fixed portion.

4. The vibration motor according to claim 1, wherein the coils are flat coils, comprising a first coil disposed on the top wall and a second coil disposed on the bottom wall, and the first coil and the second coil are disposed corresponding to each other.

5. The vibration motor according to claim 4, wherein the iron core comprises a main body portion, a first fixed end extending from the main body portion toward the top wall, and a second fixed end extending from the main body portion toward the bottom wall, the first coil is sleeved over the first fixed end, and the second coil is sleeved over the second fixed end.

6. The vibration motor according to claim 5, wherein the second elastic support component comprises first connecting springs connecting the first vibrator and the iron core and second connecting springs connecting the second vibrator and the iron core.

7. The vibration motor according to claim 6, wherein support blocks are disposed at two sides of the iron core, the support blocks are connected to the housing, and one end of the second elastic support component is fixed to the support block and the other end is fixed with the vibrator.

8. The vibration motor according to claim 6, wherein the iron core is provided with a boss extending from the main body portion toward the side wall, and one end of the second elastic support component is fixed to the boss and the other end is fixed with the vibrator.

9. The vibration motor according to claim 6, wherein the second elastic support component is a wavy spring.

10. The vibration motor according to claim 6, wherein the first connecting springs are a pair, the first connecting springs are disposed at two sides of the first vibrator respectively, the second connecting springs are a pair, and the second connecting springs are disposed at two sides of the second vibrator respectively.

* * * * *